United States Patent
Fertell et al.

(10) Patent No.: US 7,958,237 B2
(45) Date of Patent: Jun. 7, 2011

(54) METHOD FOR MANAGING COMPUTER NETWORK ACCESS

(75) Inventors: David A. Fertell, Chester Springs, PA (US); Joseph I. Field, Jr., Herndon, VA (US)

(73) Assignee: Pearl Software, Inc., Exton, PA (US)

( * ) Notice: Subject to any disclaimer, the term of this patent is extended or adjusted under 35 U.S.C. 154(b) by 1761 days.

(21) Appl. No.: 10/055,407

(22) Filed: Jan. 23, 2002

(65) Prior Publication Data

US 2002/0099825 A1 Jul. 25, 2002

Related U.S. Application Data

(60) Provisional application No. 60/263,536, filed on Jan. 23, 2001.

(51) Int. Cl.
*G06F 15/173* (2006.01)
(52) U.S. Cl. ..................................................... 709/225
(58) Field of Classification Search ...... 707/4; 713/201; 709/225
See application file for complete search history.

(56) References Cited

U.S. PATENT DOCUMENTS

| | | | | |
|---|---|---|---|---|
| 5,950,195 A | * | 9/1999 | Stockwell et al. | 707/4 |
| 6,198,824 B1 | * | 3/2001 | Shambroom | 380/279 |
| 6,381,631 B1 | * | 4/2002 | van Hoff | 709/202 |
| 6,880,089 B1 | * | 4/2005 | Bommareddy et al. | 726/11 |
| 7,113,994 B1 | * | 9/2006 | Swift et al. | 709/229 |
| 2002/0002686 A1 | * | 1/2002 | Vange et al. | 713/201 |
| 2006/0077977 A1 | * | 4/2006 | Caronni et al. | 370/392 |

* cited by examiner

*Primary Examiner* — J Bret Dennison
(74) *Attorney, Agent, or Firm* — The Webb Law Firm

(57) ABSTRACT

A client computer initiates a first communication session at a first network address and receives therefrom a second network address. The client computer then initiates a second communication session at the second network address and receives therefrom an access configuration including a control setting for a communication protocol capable of being utilized during a third communication session. Concurrent with the second communication session, the client computer initiates a third communication session at a third network address whereupon the conveyance of data to or from an instantiated process on the client computer via the third communication session is controlled based on the control setting for the communication protocol.

10 Claims, 7 Drawing Sheets

| WEBLOG | | | | | |
|--------|--------|---------|-----------|---------|-----------|
| SORT | WEB | TEXT | | +ADD | CLOSE |
| PROTOCAL | NETWORK ADDRESS (NA) | SUBJECT | DATE / TIME | CONTROL | USER |
| WEB | http://www.abcnews.com | ACTION NEWS | 05/07/2001 08:00 AM | ALLOW LIST | SCANTRELL |
| MAIL | dl@pearlsw.com | STOLEN GOODS FOR SALE | 05/08/2001 09:00 AM | WORD | SCANTRELL |
| WEB-MAIL | http://mail.yahoo.com | OUTBOUND MAIL | 01/04/2001 01:00 PM | TIME | SCANTRELL |
| NEWS | alt.binaries.fun | LOST KITTEN | 10/12/2001 12:22 PM | | SCANTRELL |
| Ftp | ftp://ftp.microsoft.com | | 08/09/2001 10:45 AM | | SCANTRELL |
| CHAT | ICQ65345678 | YOU DID WHAT? | 10/12/2001 04:13 PM | BLOCK ALL | SCANTRELL |
| WEB | http://www.nakednews.com | NAKED NEWS | 09/10/2001 07:36 AM | BLOCK LIST | SCANTRELL |
| WEB | http://www.cnn.com | CNN.COM | 09/10/2001 07:45 AM | | SCANTRELL |

FIG. 7

METHOD FOR MANAGING COMPUTER NETWORK ACCESS

CROSS REFERENCE TO RELATED APPLICATIONS

The present application claims priority from U.S. Provisional Patent Application Ser. No. 60/263,536, filed Jan. 23, 2001.

BACKGROUND OF THE INVENTION

1. Field of the Invention

The present invention relates to monitoring and controlling of data associated with transactions occurring over a computer network, such as a local area network, a wide area network or the Internet.

2. Description of Related Art

Recent studies indicate that more than 50% of all computer network, e.g., Internet, transactions taking place within an organization are not business related. To this end, 79% of all organizations have detected employee abuses of Internet access privileges. Moreover, 64% of organizations participating in a survey acknowledge financial loses from abuses of Internet access privileges. In addition, because of its ease of use and the misguided perception that the Internet is a secure communication medium, the Internet has engendered an increase in sexual harassment and other hostile workplace issues.

As a result, there is an increasing need to control computer network access to prevent abuses and/or to provide evidence to support employee disciplinary action. In addition, there is a need to reduce or eliminate misuse of a computer network within organizations in order to preserve the network bandwidth for work related purposes. Lastly, there is a need for an enforcement tool to back computer network acceptable use policies. However, at the present time, no means exists that fulfills all of these needs.

It is, therefore, an object of the present invention to overcome the above problems and others by providing a method for controlling computer network access where each user's access to the computer network can be selectively controlled and records of each user's computer network transactions, especially prohibited transactions, can be stored for subsequent retrieval and analyses. Still other objects of the invention will become apparent to those of ordinary skill in the art upon reading and understanding the following detailed description.

SUMMARY OF THE INVENTION

Accordingly, we have invented a method for controlling computer network access. The method includes initiating at a client computer a first communication session at a first network address and receiving at the client computer via the first communication session a second network address. A second communication session is initiated at the client computer at the second network address. The client computer receives via the second communication session an access configuration including a control setting for at least one communication protocol capable of being utilized during a third communication session. A process is instantiated on the client computer which initiates a third communication session at a third network address. Lastly, in connection with the third communication session, the conveyance of data to and/or from the process instantiated on the client computer is controlled based on the control setting for the one communication protocol.

The access configuration can include a list related to the control setting for the one communication protocol. The conveyance of data via the third communication session can be controlled based on the list.

The communication protocols capable of being utilized include World Wide Web (WWW or Web), File Transfer Protocol (FTP), E-mail, News, Chat, Instant Messaging, Telnet and Peer-to-Peer. These protocols represent generic classes of communication protocols. The specific listing of these protocols is not to be construed as limiting the scope of the invention since the present invention is capable of operating with other, unspecified, protocols or classes of protocol.

The control setting can include unrestricted computer network access (Allow All); no computer network access (Block All); limited computer network access to network addresses included in an allow list (Allow Listed); and unrestricted computer network access except to network addresses included in a block list (Block Listed). The access configuration can further include at least one of the following global control settings: access prohibited to convey data having a predetermined word and/or phrase; access prohibited to data of at least one predetermined data type, e.g., cookies; access prohibited to data conveyed during at least one of a predetermined time and day-of-week; and access prohibited based on a rating for a category included with the conveyed data. The conveyance of data to and/or from the process instantiated on the client computer can also be based on the at least one global control setting.

The method can further include the step of terminating the first communication session after the client computer receives the second network address. The second communication session can also be terminated after the client computer receives the third network address.

At suitable times, the client computer can transmit via the second communication session a request to receive another access configuration including a control setting for the one communication protocol. In response to this request, the client computer receives via the second communication session the other access configuration. The conveyance of data to and/or from the process instantiated on the client computer can be controlled based on the control setting included in the other access configuration.

The step of controlling the conveyance of data can include the steps of determining the communication protocol from the conveyed data and determining from the thus determined communication protocol the control setting therefor. The method can also include the step of transferring at least part of the control data to the second network address via the second communication session. This transferred data can include a network address and/or a subject of the third communication session. Lastly, the method can include the step of transferring with the data a login name received by the client computer during a login procedure by a user thereof.

We have also invented a method for controlling computer network access that includes storing a first network address at a client computer. A first communication session is initiated between the client computer and a first server computer at the first network address. The client computer receives a second network address from the first server computer via the first communication session. A second communication session is initiated between the client computer and a second server computer at the second network address. The client computer receives from the second server computer an access configuration including a control setting for at least one communication protocol capable of being utilized during a third communication session. A process is instantiated on the client computer which initiates a third communication session between the client computer and a remote computer at a third network address. In connection with the third communication session, the conveyance of data to and/or from the instantiated process on the client computer is controlled based on the control setting for the one communication protocol.

The first and second server computers can be the same server computer.

The method can further include the step of terminating the first communication session after the client computer receives the second network address. The second communication session can also be terminated after the client computer receives the third network address.

The access configuration can also include at least one of the following global control settings: access prohibited to convey data having a predetermined word and/or phrase; access prohibited to data having at least one predetermined data type; access prohibited to data conveyed during at least one of a predetermined time and day-of-week; and access prohibited based on a rating for a category included with the conveyed data. The step of controlling the conveyance of data to and/or from the process instantiated on the client computer can also be based on the at least one global control setting.

Prior to receipt of the access configuration at the client computer, the control setting for the one communication protocol is selected from a plurality of different control settings therefor. Each global control setting is selected nonexclusively of any other global control settings.

The method can also include the steps of initiating at the client computer via the second communication session a request to the second server computer to transmit another access configuration. The other access configuration can be received at the client computer from the second server computer. Thereafter, the conveyance of data to and/or from the instantiated process on the client computer can be controlled based on a control setting included in the other access configuration for the one communication protocol.

The control setting for the one communication protocol can have a list associated therewith. The conveyance of data via the third communication session can be controlled based upon an entry, e.g., a network address, included in the list.

Lastly, the method can include the step of determining the communication protocol from the conveyed data.

BRIEF DESCRIPTION OF THE DRAWING(S)

FIG. 7 is a schematic drawing of a dialog box for displaying data regarding computer network activity of a user.

DETAILED DESCRIPTION OF THE INVENTION

The present invention is a software program which is configured to operate on a plurality of computers connected together via a computer network, such as a local area network, a wide area network or the Internet.

The software program has two major components, namely, a server control manager (SCM) and a client control manager (CCM). The SCM is installed on one of the computers which, in the context of the computer network, operates as a server computer. The SCM can also be installed across two or more computers which co-act to perform the function of a server computer. The CCM is installed on one or more client computers connected to the server computer via the computer network. The SCM and the CCM co-act in a manner to be described hereinafter.

The SCM includes an access manager that an administrator of the server computer utilizes to establish an access configuration for each user or group of users of the client computers. This access configuration is stored at the server computer and, at an appropriate time, is supplied to a client computer to define for the user of the client computer computer network access rights and access restrictions of the user. Lastly, the access manager also enables the administrator of the server computer to view, sort and analyze data related to actual or attempted computer network transactions by the user of a client computer having the CCM installed thereon.

Figure 1:
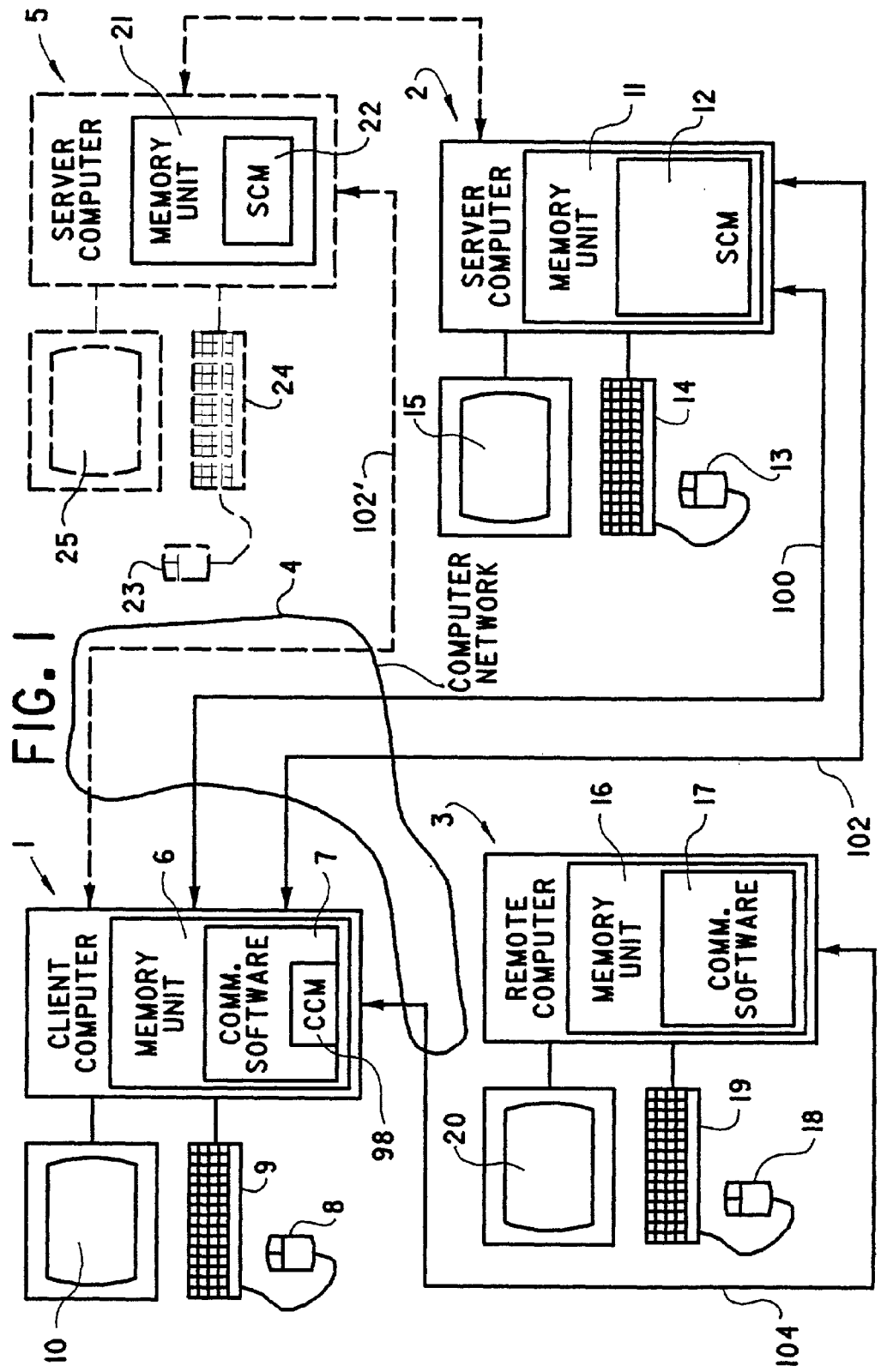
FIG. 1 is a block diagram of hardware utilized to implement a method in accordance with the present invention.

With reference to FIG. 1, a client computer 1, a server computer 2 and a remote computer 3 are connected to a computer network 4. Optionally, another server computer 5 which co-acts with server computer 2 is connected to computer network 4. Computers 1, 2, 3, and 5 are each assigned unique network addresses that enable each computer to communicate with the other computers via computer network 4. Computer network 4 can include one or more servers (not shown) and/or one or more routers (not shown) that facilitate communication between computer 1, 2, 3 and 5 based upon the network addresses assigned to each computer.

Client computer 1 includes a memory unit 6 for storing communication software 7. Client computer 1 also includes a mouse 8, a keyboard 9 and a display 10 which collectively operate as a man-machine interface between client computer 1 and a user thereof. Server computer 2 includes a memory unit 11 for storing a server control manager software (SCM) 12. Server computer 2 also includes a mouse 13, a keyboard 14 and a display 15 which collectively operate as a man-machine interface between server computer 2 and the administrator thereof. Remote computer 3 includes a memory unit 16 for storing communication software 17. Remote computer 3 also includes a mouse 18, keyboard 19 and display 20 which collectively act as a man-machine interface between remote computer 3 and a user thereof. Lastly, server computer 5 includes a memory unit 21 for storing an SCM 22. Server computer 5 also includes a mouse 23, a keyboard 24 and a display 25 which collectively operate as a man-machine interface between server computer 5 and an administrator thereof. Communication software 7 and 17, and SCM 12 and 22 control the operation of client computer 1, server computer 2, remote computer 3 and server computer 5, respectively, to communicate data therebetween in a manner known in the art.

In FIG. 1, one client computer 1 is shown. However, the present invention is scalable to operate on a plurality of client computers 1 connected to server computer(s) 2 and/or 5 via computer network 4.

SCM 12 can display on display 15 a plurality of dialog boxes that the administrator of server computer 2 utilizes to select control settings of each user or user group of one or more of client computers 1. More specifically, the control settings of each user or user group can be individually selected based on a login name assigned to each user or user group. A generic set of control settings can also be selected for each user or user group not having unique control settings selected therefor based on a login name assigned to each user or user group. The selection of the control settings for a user or user group of client computer 1 will now be described with reference to FIGS. 2-6 and with continuing reference to FIG. 1. For convenience of description, the present invention will be described in connection with a user of client computer 1. However, it is to be appreciated, that the present invention is also usable in connection with a plurality of users of one or more client computers 1 and/or one or more user groups of one or more client computers 1, where each user and/or user group has a unique login name.

Initially, the administrator of server computer 2 utilizes the access manager to assign a login name to a user of client computer 1. This login name is stored in an access configuration, to be described hereinafter, and is utilized as the basis for associating the control settings selected by the administrator of server computer 2 for the user associated with the login name. Next, the administrator of server computer 2 causes the access manager to display on display 15 a control settings dialog box 28, shown in FIG. 2, associated with the login name of the user. Control settings dialog box 28 includes an activity control setting section 30, a global control setting section 32 and a push button section 34. Activity control setting section 30 includes a plurality of columns 36-1-36-5, each of which is related to a particular communication protocol, and a plurality of rows 38-1-38-5 each of which is related to a particular control setting for each communication protocol in columns 36-1-36-5. The intersection of each row column 36 and each row 38 includes a selection means, such as a radio button 40, which the administrator of server computer 2 selects, in a manner known in the art in order to select the control setting desired for each communication protocol.

The communication protocols shown in columns 36-1-36-5 include Web, FTP, E-mail, News and Chat, respectively. In addition, other communication protocols, such as Instant Messaging, Telnet and Peer-to-Peer can also be included in a column 36 of activity control setting section 30. It is to be understood that the foregoing communication protocols are generic examples of communication protocols. Accordingly, the following description of the present invention in connection with any of the foregoing communication protocols is not to be construed as limiting the invention since the present invention can be adapted to work with any known or hereinafter developed communication protocol. The control settings included in rows 38-1-38-5 include Off, Allow All, Allow Listed, Block All and Block Listed, respectively. Activity control setting section 30 is shown for purpose of illustration and is not to be construed as limiting the invention since the administrator of server computer 2 can change the number of columns 36 and/or rows 38, the communication protocol assigned to each column 36 and/or the control setting assigned to each row 38 in any desired manner.

In operation, the administrator of server computer 2 selects a desired radio button 40 for each communication protocol in columns 36-1-36-5 in order to select the desired control setting therefor. In order to avoid the selection of conflicting control settings for each communication protocol, the selection of one radio button 40 in a column 36 is mutually exclusive of the selection of any other radio buttons 40 in the same column 36. The access manager is also configured to highlight as a default selection the radio button 40 associated with the Allow All control setting, i.e., radio button 40 in row 38-2, of each communication protocol. The selection of any other radio button 40 in each column 36 will override this default selection.

With reference to FIGS. 3a-3e, and with continuing reference to all previous Figs., the Allow Listed control setting in row 38-3 for each communication protocol in columns 36-1-36-5 has associated therewith an allow list 46-1-46-5, respectively. Each Allow List 46 includes a list of network addresses that the user having the login name associated with control settings dialog box 28 is permitted to access for the corresponding communication protocol. Each network address can include an alpha string, a numeric string, a symbol string or some combination thereof. If radio button 40 for the Allow Listed control setting for the Web protocol (column 36-1) is selected, access by the user having the login name associated with dialog box 28 will be permitted only to the network addresses included in allow list 46-1. Similar comments apply in respect of the selection of radio buttons 40 for the Allow Listed control settings associated with the FTP protocol (column 36-2), the E-mail protocol (column 36-3), the News protocol (column 36-4) and the Chat protocol (column 36-5) for network addresses included in allow lists 46-2-46-5, respectively.

The Block Listed control setting in row 38-5 for each communication protocol in columns 36-1-36-5 has associated therewith a block list 48-1-48-5, respectively. Each block list 48 includes a list of network addresses that the user having the login name associated with control settings dialog box 28 is not permitted to access for the corresponding communication protocol. For example, if radio button 40 for the Block Listed control setting for the Web protocol (column 36-1) is selected, access by the user having the login name associated with dialog box 28 will not be permitted to network addresses included in block list 48-1. Similar comments apply in respect of the selection of radio buttons 40 for the Block Listed control settings associated with the FTP protocol (column 36-2), the E-mail protocol (column 36-3), the News protocol (column 36-4) and the Chat protocol (column 36-5) for network addresses included in block lists 48-2-48-5, respectively.

If radio button 40 for the Allow All control setting for the Web protocol (column 36-1) is selected, the user having the login name associated with dialog box 28 is granted unlimited access to any network addresses utilizing this communication protocol. Similar comments apply in respect of the selection of radio buttons 40 for the Allow All control settings associated with the FTP protocol (36-2), the E-mail protocol (column 36-3), the News protocol (column 36-4) and the Chat protocol (column 36-5) for granting the user unlimited access to all network addresses that utilize the corresponding communication protocol.

If radio button 40 for the Block All control setting for the Web protocol (column 36-1) is selected, the user having the login name associated with dialog box 28 is denied access to all network addresses utilizing this communication protocol. Similar comments apply in respect of the selection of radio buttons 40 for the Block All control settings associated with the FTP protocol (column 36-2), the E-mail protocol (column 36-3), the News protocol (column 36-4) and the Chat protocol (column 36-5) for denying access to network addresses that utilize the corresponding communication protocol.

If the Allow All, Allow Listed, Block All or Block Listed control setting is selected for a particular communication protocol, each time the user of client computer 1 attempts a network transaction utilizing this communication protocol, a record of the transaction is stored in memory unit 11 of server computer 2 in a manner to be described hereinafter.

If radio button 40 for the Off control setting for the Web protocol (column 36-1) is selected, the user having the login name associated with dialog box 28 is granted unlimited access to any network addresses utilizing this communication protocol. However, no record of each transaction that uses the Web protocol is stored in memory unit 11 of server computer 2. Similar comments apply in respect of the selection of radio buttons 40 for the Off control settings associated with the FTP protocol (column 36-2), the E-mail protocol (column 36-3), the News protocol (column 36-4) and the Chat protocol (column 36-5) for granting unlimited access to any network addresses that utilize the corresponding communication protocol and not storing a record of each transaction in memory unit 11 of server computer 2.

Figure 4:
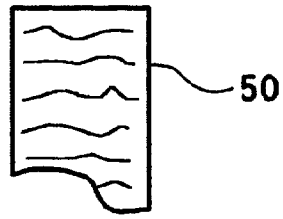
FIG. 4 is a schematic drawing of a restricted word and phrase list for controlling computer network access in accordance with the present invention.

With reference to FIG. 4, and with continuing reference to all previous Figs., global control settings section 32 includes boxes 39-1-39-3. In response to selecting box 39-1, if a transaction conveys data having at least one word and/or phrase included in a restricted word and phrase list 50, transmission of the data to or from communication software 7 will be blocked. In response to selecting box 39-2, the transmission to or from communication software 7 of "behind-the-scenes" data, i.e., data that is not directly presented to the user, such as cookies, is blocked.

Push button section 34 includes an Ok push button 42 and a Cancel push button 44. In response to selecting Ok push button 42, server computer 2 stores in the access configuration for the login name associated with dialog box 28 (i) an indication of the radio buttons 40 selected for each type of communication protocol, (ii) an indication of the boxes 39-1 and 39-2 selected, and (iii) the Allow Lists 46-1-46-5, the Block Lists 48-1-48-5 and the restricted word and phrase list 50. This access configuration is stored in memory unit 11 of server computer 2 for download to client computer 1 for use by the user thereof entering into client computer 1 during a login procedure the login name which is stored in the access configuration. Since the lists 46, 48 and 50 for each user are stored at server computer 2, the administrator of server computer 2 can update each list as desired. Selecting Cancel push button 54, however, terminates dialog box 28 without storing in the access configuration any selections made in dialog box 28 or any of the lists 46, 48 and 50.

Figure 5:
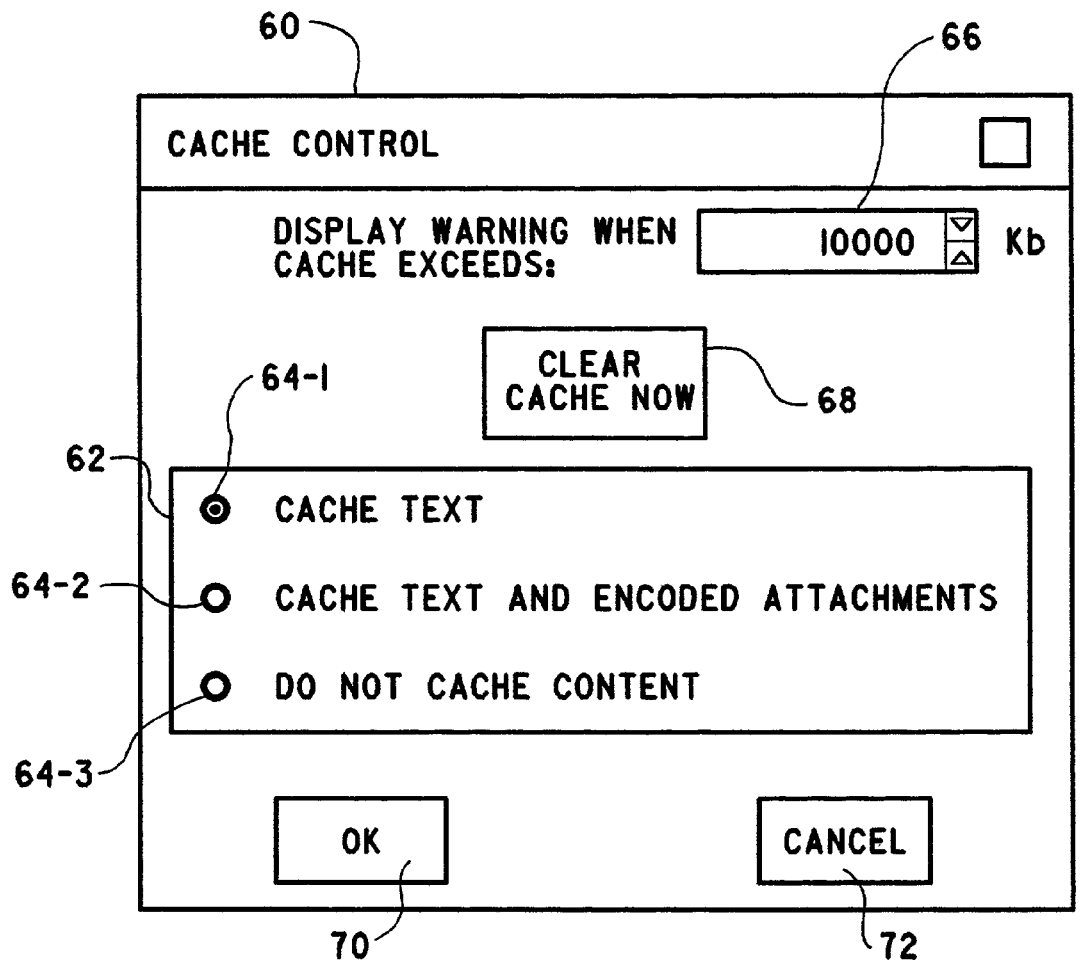
FIG. 5 is a schematic drawing of a dialog box for selecting whether to store text and/or encoded attachments associated with computer network transactions in accordance with the present invention.

With reference to FIG. 5, and with continuing reference to all previous Figs., the administrator of server computer 2 can cause the access manager to display on display 15 a cache control dialog box 60 associated with the login name of the user. Dialog box 60 includes a selection section 62 including three radio buttons 64-1-64-3. In response to selecting radio button 64-1, server computer 2 will store in a cache memory (not shown) of memory unit 11 a complete or partial copy of any transaction for which a record is stored in memory unit 11 of server computer 2. More specifically, if radio button 64-1 is selected, each time a record of a transaction on client computer 1 is stored in memory unit 11 of server computer 2, a complete or partial copy of the transaction is stored in the cache memory. If radio button 64-2 is selected, each time a record of a transaction on client computer 1 is stored in memory unit 11 of server computer 2, a complete or partial copy of the transaction and any encoded attachments conveyed with this transaction are stored in the cache memory. Lastly, if radio button 64-3 is selected, no copy of any transaction or encoded attachments are stored in the cache memory.

The amount of space allocated for cache memory can be selected by entering a desired amount of cache memory in a cache memory size select field 66 of dialog box 60. Dialog box 60 can also include a Clear Cache Now push button 68. In response to selecting push button 68, server computer 2 erases the contents stored in the cache memory. Lastly, dialog box 60 includes an Ok push button 70 and a Cancel push button 72. In response to selecting Cancel push button 72, the display of dialog box 60 on display 15 is terminated and any selections made in dialog box 60 are not saved in the access configuration for the login name associated with dialog box 60. In contrast, in response to selecting Ok push button 70, the display of dialog box 60 on display 15 is terminated and the selection of one of the radio buttons 64 and the amount of cache memory in cache memory size select field 66 are stored in the access configuration for the login name associated with dialog box 60.

Figure 6:
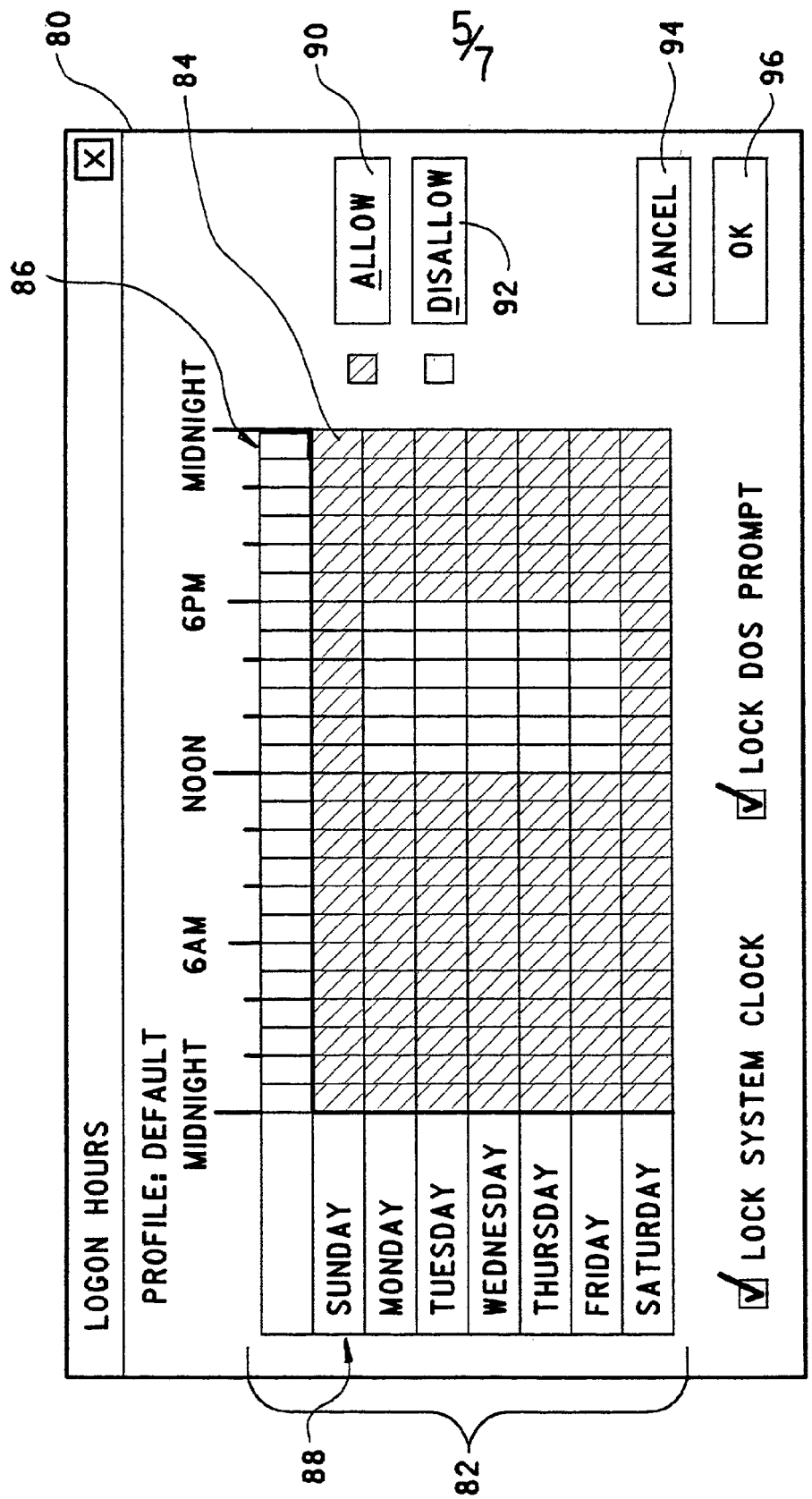
FIG. 6 is a schematic drawing of a dialog box for selecting the times and days a user is granted access to a computer network.

With reference to FIG. 6, and with continuing reference to all previous Figs., the administrator of server computer 2 can cause the access manager to display a Logon Hours dialog box 80 on display 15. Dialog box 80 includes a time-day array 82 that includes a plurality of time columns 86 and a plurality of day rows 88. Utilizing the point and click method, the administrator of server computer 2 can select each box 84 formed by the intersection of columns 86 and rows 88 of time-day array 82.

Dialog box 80 also includes an Allow push button 90, a Disallow push button 92, a Cancel push button 94 and an Ok push button 96. In response to selecting Allow push button 90, any selected boxes 84 will be marked with a suitable Allow indicia. Similarly, in response to selecting Disallow push button 92, any selected boxes 84 will be marked with a suitable Disallow indicia. Based on the Allow or Disallow indicia included in the various boxes 84, a user of client computer 1 having the login name associated with dialog box 80 will be allowed or disallowed network access at the corresponding time and day of week. As a default selection, in the absence of disallowing computer network access at certain times and certain days, the user of client computer 1 having the login name associated with dialog box 80 will have network access at these certain times and certain days.

In response to selecting Cancel push button 94, the display of dialog box 80 on display 15 is terminated and any selection of boxes 84 is not saved in the access configuration for the login name associated with the dialog box 80. In contrast, in response to selecting Ok push button 96, the display of dialog box 80 on display 15 is terminated and the allowed and disallowed times selected in boxes 84 of time-day array 82 are stored as another global control setting in the access configuration for the login name associated with dialog box 80.

When each Ok push buttons 42, 70 and 96 is selected in dialog boxes 28, 60 and 80, respectively, the various selections made in these dialog boxes are saved in the access configuration for the login name associated with the dialog box. Once saved, the access configuration for each user can be modified by the administrator of server computer 2 in a manner known in the art. Preferably, each access configuration includes all of the allow lists 46 and block lists 48.

Once the access configuration has been prepared for a login name of a user of client computer 1, the computer network access of the user logging into client computer 1 utilizing this login name is controlled as follows. With reference back to FIG. 1, a client control manager software (CCM) 98 is stored in memory unit 6 of client computer 1 and operates as a buffer between communication software 7 and the computer network 4. In response to instantiation of communication software 7, CCM 98 initiates a first communication session 100 at a first network address of server computer 2. This first network address is stored in Memory Unit 6 for use by CCM 98 to communicate with server computer 2. Once first communication session 100 has been established, CCM 98 causes SCM 12 of server computer 2 to transmit to client computer 1 via first communication session 100 a second network address. This second network address can be another network address hosted by server computer 2 or a network address hosted by server computer 5. When server computer 2 hosts the second network address, in response to receiving the second network address, client computer 1 initiates a second communication session 102 with server computer 2 at the second network address. When the second network address is hosted by server computer 5, in response to receiving the second network address, client computer 1 initiates a second communication session 102' with server computer 5. Whichever server computer 2 or 5 hosts the second network address, the access configuration file for the login name of the user of client computer 1 is stored thereat. For convenience of describing the present invention, server computer 2 will be described as hosting the second network address. However, this is not to be construed as limiting the invention.

Once second communication session 102 has been established, CCM 98 causes communication software 7 to terminate first communication session 100 and causes SCM 12 to download to client computer 1 a copy of the access configuration stored in memory unit 11 for the login name entered into client computer 1 by the user thereof during a login procedure. To enable SCM 12 to download the appropriate access configuration, CCM 98 transmits to server computer 2 via second communication session 102 the login name entered by the user of client computer 1 during the login procedure. In response to receiving this login name, SCM 12 searches memory unit 11 for the access configuration including this login name. In response to locating this access configuration, SCM 12 transmits a copy of this access configuration to client computer 1 via second communication session 102. If SCM 12 does not locate an access configuration including the login name entered into client computer 1 during the login procedure, SCM 12 can transmit a copy of a generic access configuration to client computer 1 via second communication session 102e. This generic access configuration can be established by the administrator of server computer 2 for each user of client computer 1 not having a login name included in an access configuration stored in memory unit 11. Upon receiving the access configuration, CCM 98 stores the access configuration in memory unit 6.

Once the access configuration is stored in memory unit 6, CCM 98 commences monitoring and controlling transactions between communication software 7 and computer network 4 based thereon For purpose of describing the operation of CCM 98, it will be assumed that the radio buttons and boxes shown selected in dialog boxes 28, 60 and 80 have been selected.

Next, the user of client computer 1 initiates concurrent with second communication session 102 a third communication session 104 at a third network address of remote computer 3. Once third communication session 104 is established, CCM 98 commences monitoring data associated with actual or attempted transactions via third communication session 104. More specifically, CCM 98 determines from the data associated with each transaction the communication protocol being utilized. This data can include control data and content data. Control data is typically a header and/or a footer appended to the content data, but is not necessarily limited thereto. Content data contains the essence of any information, e.g., text, being conveyed via third communication session 104. Once CCM 98 determines the communication protocol of the transaction, CCM 98 determines from the access configuration received by client computer 1 the control setting that was selected for this communication protocol. For example, if CCM 98 determines that the transaction utilizes the Web protocol common to communications on the World Wide Web, i.e., HTTP, CCM 98 can then determine from the access configuration that the Block Listed control setting was selected for the Web protocol. Based on the selection of this control setting, CCM 98 will utilize block list 48-1. Next, CCM 98 extracts from the control data of the transaction the network address included therein and compares this network address to the network addresses included in block list 48-1. In the event of a match, CCM 98 blocks the conveyance of data comprising the transaction to or from communication software 7 of client computer 1. In contrast, in the absence of a match, CCM 98 permits the data comprising this transaction to be conveyed to or from communication software 7.

With reference to FIG. 7, and with continuing reference to all previous Figs., at a suitable time, SCM 12 creates in memory unit 11 for each login name an activity list 122 of transactions occurring via third communication session 104 in connection with this login name. Except for communication protocols where the Off control setting was selected in control setting dialog box 28, activity list 122 for each login name will include a record of each actual or attempted transaction occurring via third communication session 104. Alternatively, activity list 122 for each user can include only records of actual or attempted transactions that were blocked by CCM 98. For purpose of describing the invention, it will be assumed that a record is entered in activity list 122 for the login name of the user of client computer 1 for each actual or attempted transaction occurring via third communication session 104.

Figure 2:
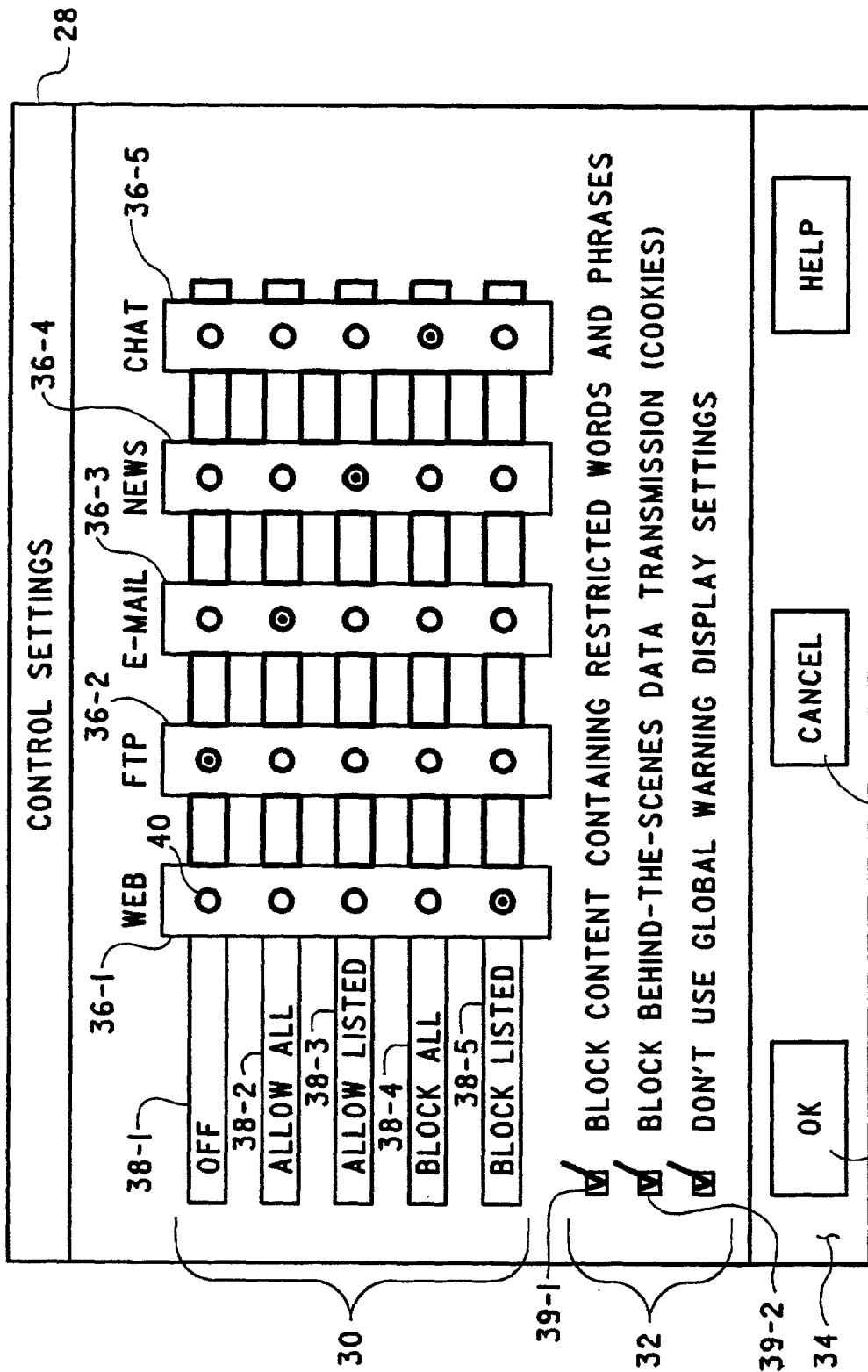
FIG. 2 is a schematic drawing of a dialog box for selecting control settings utilized for controlling computer network access in accordance with the present invention.
Figure 3A:
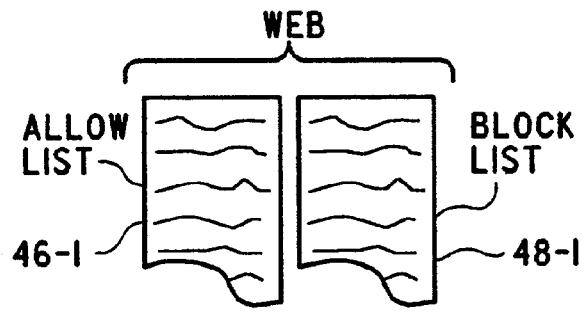
FIGS. 3a-3e are schematic drawings of Allow Lists and Block Lists utilized for controlling various types of communication protocols in accordance with the present invention.
Figure 3B:
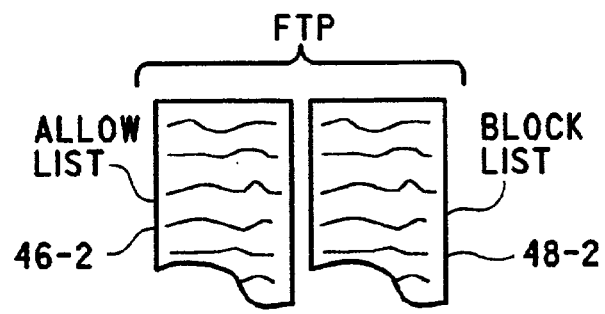
Figure 3C:
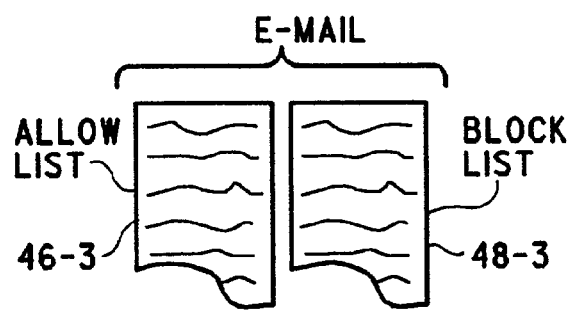
Figure 3D:
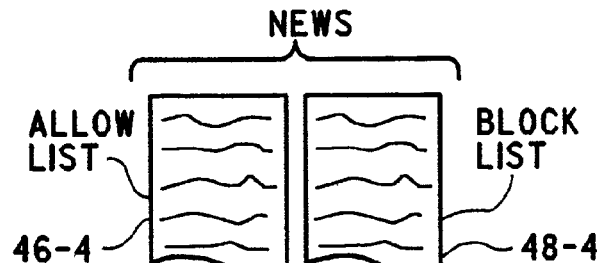
Figure 3E:
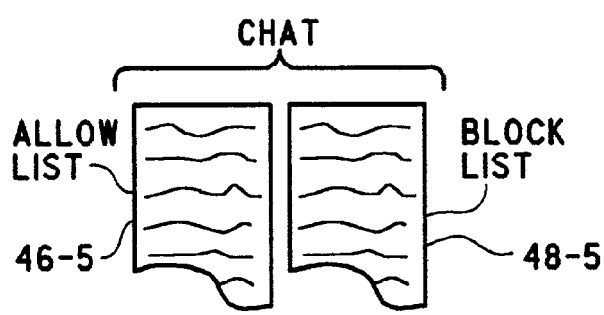

Except for transactions that utilize a communication protocol where the Off control setting was selected in FIG. 2, when an actual or attempted transaction via third communication session 104 occurs, CCM 98 transmits to server computer 2 via second communication session 102 certain data regarding the transaction. In response to receiving this data, SCM 12 forms from this data a record of the transaction which is stored in activity list 122 associated with the login name of the user of client computer 1. At a suitable time, the administrator of server computer 2 can cause SCM 12 to display on display 15 an Activity Log dialog box 120 which includes activity list 122 associated with the login name of the user of client computer 1 that initiated third communication session 104. Activity Log dialog box 120 includes columns 124-1-124-6 entitled Protocol, Network Address (NA), Subject, Date/Time, Control and User, respectively, for each record stored in activity list 122. Columns 124-1-124-6 in activity log dialog box 120 are shown for purpose of illustration and are not to be construed as limiting the invention since activity log dialog box 120 can include more or less columns 124, each of which can be entitled with one of the titles shown in activity log dialog box 120 or with a different title. Exemplary entries of records into activity list 122 for transactions utilizing the communication protocols shown in FIG. 2 will now be described.

If an actual or attempted transaction utilizing the Web protocol occurred via third communication session 104 without CCM 98 blocking the conveyance of data to or from communication software 7, CCM 98 transmits to server computer 2 via second communication session 102 certain data regarding the transaction to be included in a record 126 formed by SCM 12 in activity list 122 for the login name of the user of client computer 1. As can be seen, record 126 includes in column 124-1 an entry that the Web protocol was utilized, the Network Address of the transaction which is entered in column 124-2, the Subject of the transaction which is entered in column 124-3, a Date/Time of the transaction which is entered in column 124-4 and the Login name of the user of client computer 1 which is entered in column 124-6. The Date/Time entry in column 124-4 of record 126 can be supplied either by CCM 98 when transmitting the data comprising record 126 to server computer 2 or by the SCM 12 upon receipt of the data comprising record 126 from client computer 1.

Since CCM 98 permitted the data to be conveyed to or from communication software 7, record 126 does not include any data in Control column 124-5. In contrast, record 128 of activity list 122 includes in column 124-1 an entry that the Web protocol was utilized and includes in control column 124-5 the entry "Block List". This later entry is included in record 128 in response to CCM 98 blocking the conveyance of data during a transaction to or from communication software 7 based upon CCM 98 determining that the conveyed data included a network address that is also included in block list 48-1.

Activity list 122 also includes a record 130 which includes in column 124-1 an entry that the Web protocol was utilized and includes in Control column 124-5 the entry "Allow List". This later entry is included in record 130 when CCM 98 permits the conveyance of data during a transaction to or from communication software 7 based upon CCM 98 determining that the conveyed data included a network address that is also included in allow list 46-1.

If a communication protocol in a column 36 of activity control setting section 30 has its Off control setting selected, the access configuration will cause CCM 98 to permit all data having this communication protocol to be conveyed to or from communication software 7, but will not cause CCM 98 to transmit to server computer 2 via second communication session 102 any data regarding transactions utilizing this communication protocol. Therefore, no record of transactions utilizing this communication protocol are included in activity list 122. In contrast, if the Allow All control setting is selected for a communication protocol listed in a column 36, the access configuration will cause CCM 98 to permit all data having this communication protocol to be conveyed to or from communication software 7 and will cause CCM 98 to transmit to server computer 2 via second communication session 102 data to be included in a record of this transaction in activity list 122.

If, in FIG. 2, the Allow All control setting for the FTP protocol is selected, when CCM 98 determines that a transaction occurring via a third communication session 104 utilizes the FTP protocol, data regarding this transaction is transmitted via second communication session 102 to server computer 2 whereupon the SCM forms a record 132 of this transaction which is included in activity list 122. Since the Allow All control setting is selected, CCM 98 permits all data having the FTP protocol to be conveyed to or from communication software 7.

If, in FIG. 2, the Allow All control setting for the E-mail protocol is selected, when CCM 98 determines that a transaction occurring via third communication session 104 utilizes the E-mail protocol, data regarding this transaction is transmitted to server computer 2 via second communication session 102 whereupon the SCM forms a record 134 of this transaction which is included in activity list 122. In this case, since the Allow All control setting was selected, no entry would ordinarily be included in Control column 124-5 of record 134. However, in FIG. 2, if box 39-1 is selected, CCM 98 compares words and/or phrases included in the data conveyed with each transaction, regardless of the type of communication protocol, to words and phrases included in the restricted words and phrases list 50. If the conveyed data includes one or more words and/or phrases included in the restricted words and phrases list 50, CCM 98 blocks conveyance of this data to or from communication software 7 and causes SCM 12 to include an appropriate entry, e.g., Word or Phrase, in Control column 124-5 of record 134.

CCM 98 utilizes a real time time-date clock (not shown) of client computer 1 or a time and date included in the received access configuration to monitor the time and date associated with each transaction. If a transaction is attempted at a time and/or date that is disallowed in the Login Hours dialog box 80 shown in FIG. 6, CCM 98 blocks conveyance of the data to or from communication software 7 and transmits data regarding this transaction to server computer 2 via second communication session 102 whereupon SCM 12 forms a record 136 of the transaction which is included in activity list 122. Because the user of client computer 1 attempted a transaction at a disallowed time and/or date, an appropriate entry, e.g., Time or Date, is included in Control column 124-5 of record 136.

If, in FIG. 2, the Allow Listed control setting for the News protocol is selected, when CCM 98 determines that a transaction occurring via third communication session 104 utilizes the News protocol, CCM 98 compares the network address included with the conveyed data for this transaction to the network addresses listed in allow list 46-4. In the event of a match, CCM 98 permits the data to be conveyed to or from communication software 7. However, in the absence of a match, CCM 98 blocks the conveyance of the data to or from communication software 7. In either event, CCM 98 transmits to server computer 2 via second communication session 102 data regarding this transaction. In response to receiving this data, SCM 12 forms a record 138 of this transaction which is included in activity list 122. If CCM 98 permitted the data to be conveyed to or from communication software 7, no entry is included in Control column 124-5 of record 138. However, if CCM 98 blocks the conveyance of the data to or from communication software 7, an appropriate entry, e.g., Allow List, is included in Control column 124-5 of record 138.

If, in FIG. 2, the Block All control setting for the Chat protocol is selected, when CCM 98 determines that a transaction occurring via third communication session 104 utilizes the Chat protocol, CCM 98 blocks the conveyance of any data for this transaction to or from communication software 7 and transmits to server computer 2 via second communication session 102 data regarding this transaction. In response to receiving this data, SCM 12 forms a record 140 of this transaction which is included in activity list 122. Record 140 includes an appropriate entry, e.g., Block All, in Control column 124-5 of record 140 to indicate that the conveyance of data to or from communication software 7 was blocked based upon the Block All control setting.

As can be seen, the selection of the Allow All, Allow Listed, Block All, or Block Listed control settings for each communication protocol shown in control settings dialog box 28 results in a record being created in activity list 122 for each transaction that utilizes one of these communication protocols. In contrast, the selection of the Off control setting for each communication protocol shown in Control settings dialog box 28 result in no record being included in activity list 122 for transactions that utilizes one of these corresponding communication protocols.

If, in FIG. 2, box 39-2 is selected, CCM 98 will block behind-the-scenes data, transmission, i.e., data that is not directly presented to the user, such as Internet cookies. Furthermore, if radio button 64-1 in FIG. 5 is selected, CCM 98 will transmit to server computer 2 via second communication session 102 a copy of each transaction. The data comprising the record for the transaction which is included by SCM 12 in activity list 122 can be copied from the copy of the transaction transmitted to server computer 2 via second communication session 102. The copy of each transaction is stored in the cache memory of memory unit 11 in connection with the corresponding record included in activity list 122. In order to view the copy of the transaction, the administrator of server computer 2 can utilize the point and click method to select a desired record in activity list 122 whereupon the cached copy of the transaction for the select record is retrieved from the cache memory and displayed on display 15. In a similar manner, if radio button 64-2 in FIG. 5 is selected, CCM 98 will transmit to server computer 2 via second communication session 102 copies of each transaction and any encoded attachments along with the data comprising the record for the transaction which is included by SCM 12 in activity list 122. The copies of the transaction and any encoded attachments are included in cache memory in connection with the record of the transaction included in activity list 122. Lastly, if radio button 64-3 in FIG. 5 is selected, CCM 98 will not transmit to server computer 2 copies of any transactions or any encoded attachments of any transactions, and will only transmit to server computer 2 for each transaction the data comprising the record for the transaction which is included by SCM 12 in activity list 122.

Figure 8:
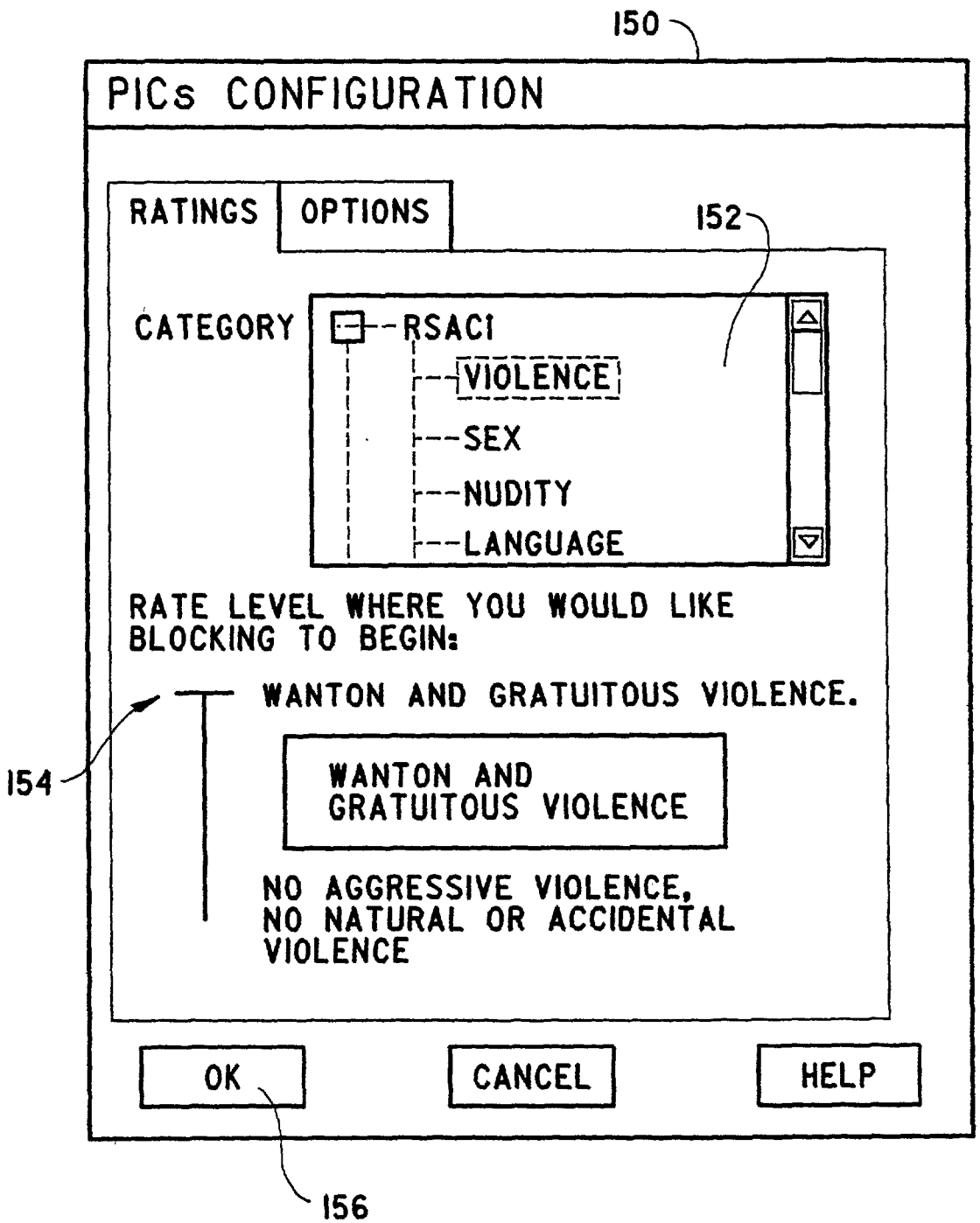
FIG. 8 is a schematic drawing of a dialog box for selecting one or more levels of control for contents of a computer network transaction based on a voluntary rating included with the data conveyed with the transaction.

With reference to FIG. 8, in addition to the control settings discussed above, other global control settings can be included in the access configuration for the login name of each user of a client computer 1 and utilized to control access to or from communication software 7. One example of another global control setting includes a control setting based upon a standardized category rating included in conveyed data by the provider thereof. In order to set the response of CCM 98 to a control setting for the standardized rating, the administrator of server computer 2 causes SCM 12 to display on display 15 a PICs Configuration dialog box 150. Dialog box 150 includes a category menu section 152 where a selection can be made of the category of data to be controlled. These categories can include, without limitation, violence, sex, nudity, language, etc. For each category of data for which control is desired, a sensitivity selection means 154 is provided in dialog box 150 to set the sensitivity of the control setting for each category. Once the sensitivity has been selected for the category, the administrator of server computer 2 utilizes the point and click method to select an Ok push button 156 in dialog box 150. The selection of Ok push button 156 causes the sensitivity selection for the selected category to be stored in the access configuration for the login name associated with dialog box 150. Thereafter, when the copy of this access configuration is transferred to client computer 1, CCM 98 compares the standardized category rating included in the conveyed data with the sensitivity for the same category stored in the access configuration for the login name of the user of client computer 1. If the standardized category rating included in the conveyed data equals or exceeds the sensitivity selected for the same category stored in the access configuration, CCM 98 blocks the conveyance of data associated with this transaction from being conveyed to or from communication software 7.

At suitable times, CCM 98 issues a request to SCM 12 via second communication session 102 for SCM 12 to transmit to client computer 1 another copy of the access configuration for the login name of the user of client computer 1. This is done to ensure that client computer 1 is utilizing the most current access configuration for the login name of the user of client computer 1. Thus, if any changes to the access configuration are made by the administrator of server computer 2, client computer 1 will receive a copy of the current access configuration at the suitable times, e.g., periodically, every few minutes.

As can be seen, the present invention provides a method for controlling computer network access where each user's access to the computer network can be selectively monitored and controlled and records of transactions for each user can be stored for subsequent retrieval and analysis. In the foregoing description, one client computer 1 and one server computer 2 were utilized to describe the invention. However, server computer 2 can be configured to simultaneously host a plurality of client computers 1 up to the number of second network addresses that server computer 2 is configured to host. Furthermore, while the present invention was described in connection with a single, third communication session 104, it is to be appreciated that each user of a client computer 1 can initiate a plurality of third communication sessions with different remote computers 3 at different network addresses whereupon each of these third communication sessions would be considered a standalone, third communication session.

The software of the present invention is preferably configured so that each instantiation of communication software 7 has its own instantiation of CCM 98. However, this is not to be construed as limiting the invention since a single instantiation of CCM 98 can be configured to control access to two or more instantiations of communication software 7 on the same client computer 1.

In the foregoing description, a unique access configuration was created and utilized in connection with each user of a client computer 1. However, additionally or alternatively, SCM 12 can be configured so that if a login name of a user of client computer 1 does not match a login name included in an access configuration stored in memory unit 11, SCM 12 transmits a copy of a generic access configuration to each client computer 1 having a user not having a login name included in an access configuration stored in memory unit 11. Each client computer 1 receiving this generic access configuration operates in the foregoing manner for the control setting and boxes selected in control settings dialog box 28 therefor.

Each list 46 and/or 48 can be customized as desired by the administrator of server computer 2 prior to download to a client computer 1. In the foregoing description, the access configuration downloaded to client computer 1 preferably included all of lists 46 and/or 48 associated therewith. However, SCM 12 can be configured to download to client computer 2 only the lists 46 and/or 48 related to the selection of the corresponding Allow Listed or Block Listed control settings for one or more communication protocols. In this manner, lists 46 and 48 that would not be used by CCM 98 are not stored in the access configuration downloaded to client computer 1. Still further, each access configuration stored in memory unit 11 of server computer 2 can include only the lists 46 and/or 48 related to the selection of the corresponding Allow Listed or Block Listed control settings for one or more communication protocols. In this manner, lists 46 and/or 48 that would not be used are not stored in the access configuration stored in memory unit 11.

Lastly, in the foregoing description, third communication session 104 was established concurrent with second communication session 102. However, this is not to be construed as limiting the invention since CCM 98 can terminate second communication session 102 after receiving the access configuration for the user of client computer 1 in memory unit 6. At appropriate times thereafter, CCM 98 can reestablish second communication session 102 with server computer 2 and use this reestablished second communication session 102 to transmit data regarding transactions to server computer 2. It is to be appreciated, that while the present invention has been described as transmitting data regarding each transaction to server computer 2, CCM 98 can store data related to a number of transactions in memory unit 6 and, at suitable times, can transmit this stored data to server computer 2. In addition, in the event second communication session 102 is terminated and cannot be reestablished, CCM 98 can use the access configuration downloaded to client computer 1 and can defer transmitting data regarding transactions to server computer 2 until second communication session 102 can be reestablished.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method for controlling computer network access, the method comprising the steps of:
    (a) initiating at a client computer a first communication session at a first network address;
    (b) receiving at the client computer via the first communication session a second network address;
    (c) initiating at the client computer a second communication session at the second network address;
    (d) receiving at the client computer via the second communication session an access configuration including a control setting for at least one communication protocol capable of being utilized during a third communication session;
    (e) instantiating on the client computer a process which initiates a third communication session at a third network address;
    (f) in connection with the third communication session, controlling the conveyance of data at least one of (i) to and (ii) from the process instantiated on the client computer based on the control setting for the one communication protocol, wherein the one communication protocol is determined from the conveyed data, and the control setting is determined from the thus determined communication protocol; and
    (g) transferring at least part of the conveyed data to the second network address via the second communication session.

2. The method as set forth in claim 1, wherein:
the access configuration includes a list related to the control setting for the one communication protocol; and
the conveyance of data via the third communication session is controlled based on the list.

3. The method as set forth in claim 1, wherein the one communication protocol includes one of:
World Wide Web (Web);
file transfer protocol (FTP);
E-mail;
News;
Chat;
Instant Messaging;
Telnet; and
Peer-to-Peer.

4. The method as set forth in claim 1, wherein the control setting is one of:
unrestricted computer network access (Allow All);
no computer network access (Block All);
limited computer network access to network addresses included in an allow list (Allow Listed); and
unrestricted computer network access except to network addresses included in a block list (Block Listed).

5. The method as set forth in claim 1, wherein:
the access configuration further includes at least one of the following global control settings:
access prohibited to conveyed data including a predetermined word or phrase;
access prohibited to data of at least one predetermined data type;
access prohibited to data conveyed during at least one of a predetermined time and day-of-week; and
access prohibited based on a rating for a category included with the conveyed data;
and
step (f) further includes the step of controlling the conveyance of data at least one of (i) to and (ii) from the process instantiated on the client computer based on the at least one global control setting.

6. The method as set forth in claim 5, wherein the at least one predetermined data type includes an Internet cookie.

7. The method as set forth in claim 1, further including at least one of:
after step (b), the step of terminating the first communication session; and
after step (d), the step of terminating the second communication session.

8. The method as set forth in claim 1, further including the steps of:
transmitting from the client computer via the second communication session a request to receive another access configuration including a control setting for the one communication protocol;
receiving at the client computer via the second communication session the other access configuration; and
performing step (f) based on the control setting included in the other access configuration.

9. The method as set forth in claim 1, wherein the transferred data includes at least one of the following:
a network address; and
a subject of the third communication session.

10. The method as set forth in claim 1, further including the step of transferring with the data a login name received by the client computer during a login procedure by a user thereof.

* * * * *